(12) United States Patent
Honda

(10) Patent No.: US 10,872,447 B2
(45) Date of Patent: Dec. 22, 2020

(54) TOPOLOGY SPECIFYING METHOD, TOPOLOGY SPECIFYING APPARATUS AND NON-TRANSITORY COMPUTER-READABLE STORAGE MEDIUM

(71) Applicant: Geocreates, Inc., Tokyo (JP)

(72) Inventor: Tsukasa Honda, Tokyo (JP)

(73) Assignee: Geocreates, Inc., Tokyo (JP)

( * ) Notice: Subject to any disclaimer, the term of this patent is extended or adjusted under 35 U.S.C. 154(b) by 0 days.

(21) Appl. No.: 16/131,059

(22) Filed: Sep. 14, 2018

(65) Prior Publication Data

US 2019/0096108 A1 Mar. 28, 2019

Related U.S. Application Data

(63) Continuation of application No. PCT/JP2016/058397, filed on Mar. 16, 2016.

(51) Int. Cl.

| | |
|---|---|
| *G06T 11/60* | (2006.01) |
| *G06T 7/536* | (2017.01) |
| *G06T 19/00* | (2011.01) |
| *G06T 17/05* | (2011.01) |
| *G01C 21/36* | (2006.01) |
| *G06K 9/00* | (2006.01) |

(52) U.S. Cl.
CPC .......... *G06T 11/60* (2013.01); *G01C 21/3602* (2013.01); *G06K 9/00604* (2013.01); *G06K 9/00671* (2013.01); *G06T 7/536* (2017.01); *G06T 17/05* (2013.01); *G06T 19/006* (2013.01); *G06T 2207/30184* (2013.01)

(58) Field of Classification Search
None
See application file for complete search history.

(56) References Cited

FOREIGN PATENT DOCUMENTS

| JP | 08-161399 | 6/1996 |
|---|---|---|
| JP | 2013041545 | 2/2013 |
| JP | 2015045940 | 3/2015 |
| JP | 2016-008894 | 1/2016 |

OTHER PUBLICATIONS

Honda, Translation of JP2015-045940; Mar. 12, 2015 (Year: 2015).*
Grothaus; "Turn Your Place Into a Smart Home on the Cheap With These Beacons," Aug. 26, 2014; pp. 1-7; https://www.fastcompany.com/3034855/turn-your-place-into-a-smart-home-on-the-cheap-with-these-beacons (Year: 2014).*

(Continued)

*Primary Examiner* — Peter Hoang
(74) *Attorney, Agent, or Firm* — JCIPRNET

(57) ABSTRACT

A topology specifying method includes: acquiring object information that shows a shape of a visible object viewed by a user, and viewing position information that shows a position or movement of the user's view in a visual recognition area viewed by the user, and specifying a topology of the visible object that is associated with the user's impression of the visible object on the basis of a shape of the visible object included in the object information, and outputting information associated with the visible object and topology information that shows the specified topology in association with the each other.

17 Claims, 13 Drawing Sheets

(56) References Cited

OTHER PUBLICATIONS

"International Search Report (Form PCT/ISA/210)" of PCT/JP2016/058397, dated Apr. 19, 2016, with English translation thereof, pp. 1-2.

"International Preliminary Report on Patentability; this report contains the following items :Form PCT/IB/338,PCT/IB/373, PCT/ISA237(cover sheet), PCT/ISA237(Box No. I),PCT/ISA237(Box No. V),PCT/IB/326", dated Sep. 27, 2018, which is English translation of "Written Opinion of the International Searching Authority", p. 1-p. 13.

* cited by examiner

| Element names | Compositions | Eye movement patterns |
|---|---|---|
| Paths | | "Looking around" or "Continuous confirming" |
| Edges | | "Confirming" + "Looking around" or "Gazing" + "Looking around" |
| Districts | | "Looking around" or "Gazing" |
| Nodes | | "Looking around" or "Continuous confirming" or "Gazing" |
| Landmarks | | "Confirming" or "Gazing" |

FIG. 6

TOPOLOGY SPECIFYING METHOD, TOPOLOGY SPECIFYING APPARATUS AND NON-TRANSITORY COMPUTER-READABLE STORAGE MEDIUM

CROSS-REFERENCE TO RELATED APPLICATIONS

The present application is a continuation application of International Application number PCT/JP2016/058397, filed on Mar. 16, 2016. The contents of this application is incorporated herein by reference in their entirety.

BACKGROUND OF THE INVENTION

The present invention relates to a topology specifying apparatus, a mobile terminal, a topology specifying method and a program for specifying the topology that a user perceives from a visible object.

An attempt has been made to reflect a result of environmental assessment on architectural and urban planning in order to design buildings and cities that are comfortable for users. Japanese Unexamined Patent Application Publication No. H8-161399 discloses a method for evaluating human living environments and reflecting the result of the evaluation on urban planning or the like.

In conventional designs of architectural planning and urban development, there has been no choice other than designs where designers design buildings and cities on the basis of their subjective views, and a user tends to use the buildings and cities passively. Accordingly, a user tends to find it difficult to have an attachment to or a rich image of buildings and cities where buildings are gathered. Efforts to take in users' opinions at workshops or the like have been made. However, it is not easy to make many users actively participate in designing buildings and cities because the scope of the users participating in the workshops is limited and there are cases where organizers of the meetings or the like manipulate the users' opinions or the users' opinions cannot be fully taken in.

BRIEF SUMMARY OF THE INVENTION

The present invention focuses on these points, and an object of the invention is to make it easier for users to actively participate in designing buildings and cities.

The first aspect of the present invention provides a topology specifying method including acquiring object information that shows the shape of the visible object viewed by a user and viewing position information that shows the position or movement of the user's view in the visual recognition area viewed by the user. The topology specifying method also includes specifying a topology of the visible object that is associated with the user's impression of the visible object on the basis of the shape of the visible object included in the object information and the viewing position information. The topology specifying method also includes outputting information associated with the visible object and topology information showing the specified topology in association with each other.

The second aspect of the present invention provides a topology specifying apparatus including an acquisition unit that acquires object information showing the shape of a visible object viewed by a user and viewing position information showing a position or movement of the user's view in a visual recognition area viewed by the user, a specifying unit that specifies a topology of the visible object, which is associated with the user's impression of the visible object, on the basis of the shape of the visible object included in the object information and the viewing position information, and an outputting unit that outputs information associated with the visible object and topology information which shows the topology specified by the specifying unit in association with each other.

The third aspect of the present invention provides a non-transitory computer-readable storage medium storing a program for causing a computer perform acquiring object information that shows the shape of a visible object viewed by a user and viewing position information that shows a position or movement of the user's view in the visual recognition area viewed by the user, specifying a topology of the visible object which is associated with the user's impression of the visible object on the basis of the shape of the visible object included in the object information and the viewing position information, and outputting the information associated with the visible object and topology information showing the specified topology in association with each other.

BRIEF DESCRIPTION OF THE DRAWINGS

FIG. 6 shows a relation between visual movement and the way composition is perceived.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

First Exemplary Embodiment

[Outline of Topology Specifying Apparatus 1 According to the First Exemplary Embodiment]

Figure 1:
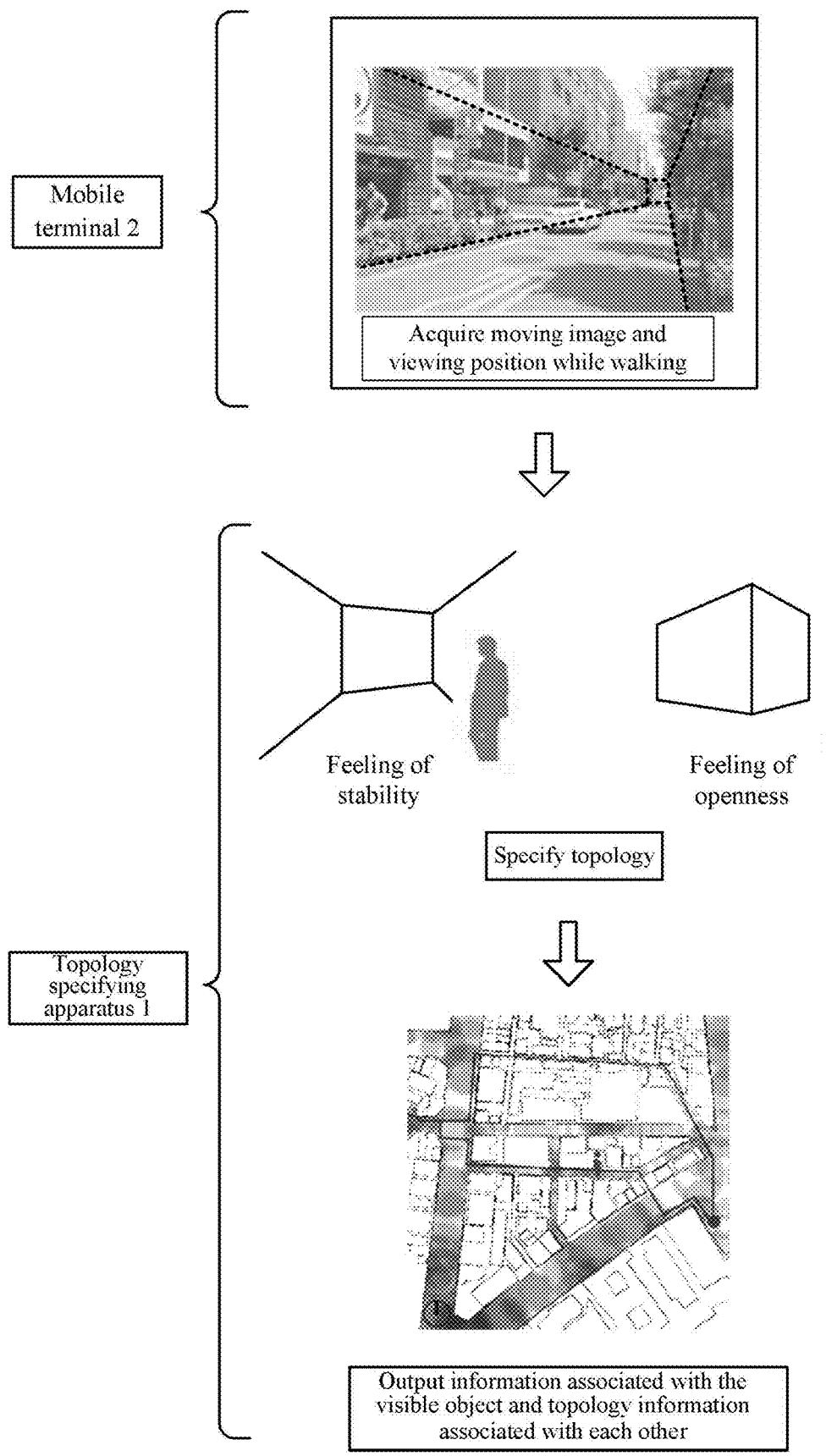

FIG. 1 shows a diagram illustrating an outline of a topology specifying apparatus 1 according to the first exemplary embodiment. The topology specifying apparatus 1 is a computer for specifying a topology of a visible object that a user perceives from a city or building (hereinafter, "city or the like"). The user includes a person residing in a city, a person who visually recognizes a building, and a person who uses the building. The topology of the visible object is a characteristic of a geometrical area, generated by a variety of surrounding physical phenomena that the user visually perceives. The characteristic of a geometrical area can evoke secondary emotions like a feeling of continuity or a feeling of tension based on basic feelings like stability (inside) and openness (outside), as an area composed of arbitrary phenomena is defined.

For example, the user is considered to feel the stability of being included in the visible object when he/she perceives a composition of one-point perspective, but on the other hand, the user is considered to feel the openness of being outside of the visible object when he/she perceives a composition of two-point perspective. Additionally, the user is considered to feel continuity regardless of being inside or outside when he/she visually perceives continuity of the visible object, but the user is considered to feel tension when his/her feelings of stability or openness change on his/her walking route. The topology specifying apparatus 1 can specify such a topology related to the user's emotion evoked by the visible object.

The topology specifying apparatus 1 specifies the topology of the visible object based on (i) a captured image obtained from a mobile terminal 2, which is a wearable terminal worn or carried by the user, and (ii) viewing position information that shows the position or movement of the user's view and is associated with the captured image. The viewing position information is information indicating coordinates corresponding to a viewing position in the captured image or information of an aspect of viewing movement. Viewing movement information, showing an aspect of viewing movement, is information of characteristics of movement, for example, "eyes do not move," "eyes slightly move," "eyes greatly move," and "eyes move in the opposite direction." The viewing position information may be coordinate group information including a plurality of coordinates that show changes of viewing positions in a continuous time frame or vector information.

The topology specifying apparatus 1 specifies a composition such as two-point perspective or one-point perspective in the captured image and specifies the composition perceived by the user based on the position and movement of the user's view, which is specified from the viewing position information. The topology specifying apparatus 1 specifies a predetermined topology corresponding to the composition perceived by the user as a topology perceived by the user.

Further, the topology specifying apparatus 1 outputs information in which information related to the visible object like a city, which is visually recognized by the user, and the specified topology are associated with each other, or information in which information related to the visible object and information corresponding to the specified topology are associated with each other. The aspect of the information output from the topology specifying apparatus 1 is arbitrary, and the topology specifying apparatus 1, for example, outputs map information in which information showing the type of the topology perceived by the user is superimposed on a map of a city visually perceived by the user. It should be noted that information of the interiors of buildings may be superimposed on a map together with roads and buildings in the map information. Furthermore, the map information may include a planar view of a building and an explanation of the interior of the building.

The above-mentioned map information enables an architect, an urban planner, a landscape designer, an interior designer, or the like to grasp the topology that users perceive from the cities, and so they can grasp how users feel about the cities or the like to help design cities or the like. By using the topologies that a plurality of users perceived, in creating map information, an image of a physical and geometrical nature inherently contained in the cities or the like can be extracted and information useful in designing good cities or the like can be provided. Then, many users can actively participate in the designing of cities or the like through the above mentioned process.

The topology specifying apparatus 1 may also output map information in which information with an aspect suitable for the user's topology perceiving characteristic is superimposed on a map of a city viewed by another user on the basis of the type of the topology perceived by the user. In this manner, the image of a physical and geometrical nature inherently contained in the cities or the like is intensified, and the user's understanding of and attachment to the cities or the like including the user him/herself, can be elevated. The user can use a map suitable for him/her, which makes it easier to navigate in a city, since the map is adapted to his/her tendency of perceiving the topology.

Next, the configuration and the function of the topology specifying apparatus 1 and the mobile terminal 2 are explained. First, the mobile terminal 2 is explained.

[Configuration of the Mobile Terminal 2]

Figure 2:
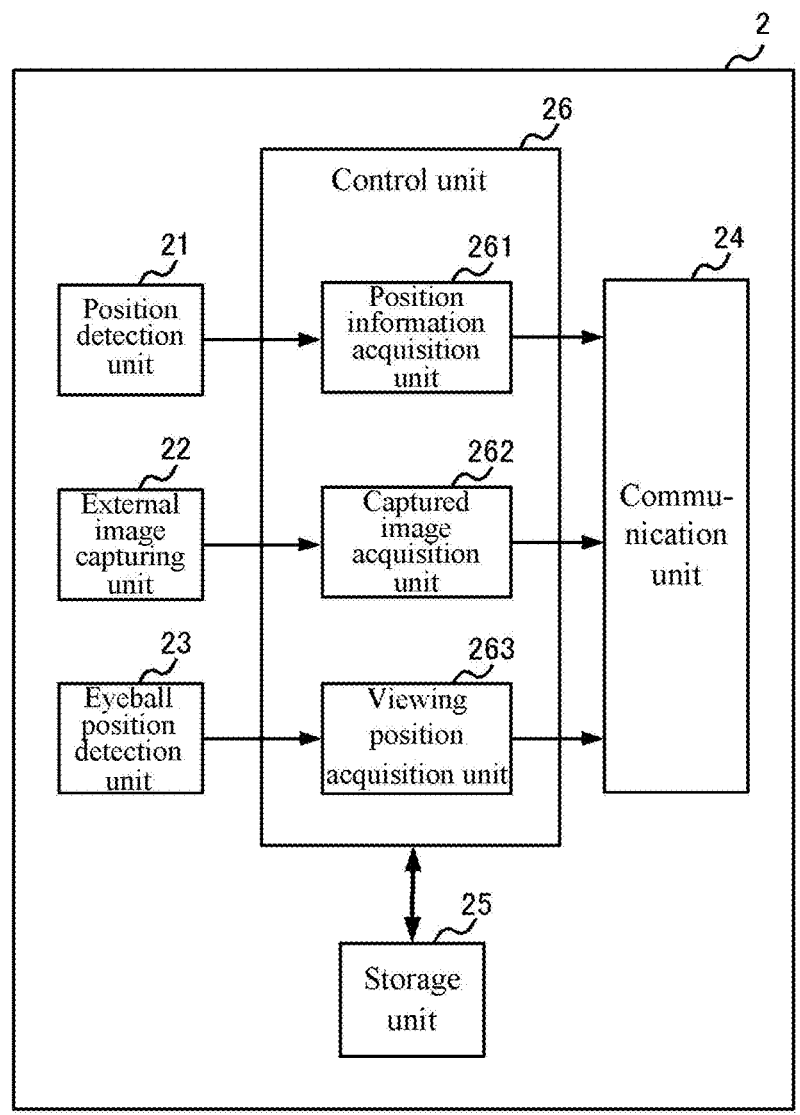
FIG. 2 shows a configuration of a mobile terminal according to the first exemplary embodiment.

FIG. 2 shows a configuration of the mobile terminal 2 according to the first exemplary embodiment.

The mobile terminal 2 is, for example, a wearable terminal worn on a user's head, or a portable terminal like a smart phone. The user can take a picture of a landscape with the mobile terminal 2, and he/she can also record his/her point of view in the landscape on the mobile terminal 2. The mobile terminal 2 creates a moving image by capturing images of spaces and paths of the cities or the like while the user wearing the mobile terminal 2 is walking and stopping in the cities or the like, and it also creates the viewing position information of the user.

The mobile terminal 2 includes a position detection unit 21, an external image capturing unit 22, an eyeball position detection unit 23, a communication unit 24, a storage unit 25, and a control unit 26. The control unit 26 includes a position information acquisition unit 261, a captured image acquisition unit 262, and a viewing position acquisition unit 263.

The position detection unit 21 detects global positioning system (GPS) signals received from a plurality of GPS satellites.

The external image capturing unit 22 generates video signals by capturing images of cities or the like in which the user wearing the mobile terminal 2 walks. The external image capturing unit 22 inputs the video signals to the captured image acquisition unit 262.

The eyeball position detection unit 23 is, for example, an infrared camera, and generates an image signal corresponding to the intensity of the reflected light on the pupil and the cornea by capturing an image of the eyeball of the user wearing the mobile terminal 2. The eyeball position detection unit 23 inputs the generated image signal to the viewing position acquisition unit 263.

The communication unit 24 is a communication interface for outputting terminal position information input from the position information acquisition unit 261, captured image data input from the captured image acquisition unit 262, and the viewing position information input from the viewing position acquisition unit 263. The communication unit 24 may include a wireless communication interface such as Wi-Fi (a registered trademark) or the like or a wired communication interface such as a universal serial bus (USB, a registered trademark) or the like.

The storage unit 25 includes, for example, a read only memory (ROM), a random access memory (RAM), a hard disk drive, and an external storage medium (for example, an SD memory card (a registered trademark)) connected to the mobile terminal 2, an external storage device, or the like. The storage unit 25 stores a variety of data such as a program executed by the control unit 26, the terminal position information, the captured image data, the viewing position information, or the like.

The control unit 26 includes, for example, a central processing unit (CPU). The control unit 26 functions as the position information acquisition unit 261, the captured image acquisition unit 262, and the viewing position acquisition unit 263 by executing the program stored in the storage unit 25.

The position information acquisition unit 261 acquires terminal position information (for example, latitude and longitude information), which shows the position of the mobile terminal 2, based on the GPS signal detected by the position detection unit 21.

It should be noted that the mobile terminal 2 may include, as the position detection unit 21, an accelerometer which detects the acceleration and an orientation sensor which detects the orientation corresponding to the front side of the mobile terminal 2. Then, the position information acquisition unit 261 may calculate the terminal position information that shows the position relative to the standard position (for example, the position from where the image capturing has been started) based on the detected acceleration and orientation.

The captured image acquisition unit 262 generates the captured image data in which the coordinate of an imaging area and the pixel value are associated with each other on the basis of the video signal input from the external image capturing unit 22. Here, the generated captured image data is a video data including, for example, a plurality of images and information showing the playback position (elapsed time from the start of image capturing) corresponding to the images. The captured image acquisition unit 262 records the generated captured image data on the storage unit 25.

The viewing position acquisition unit 263 detects the coordinates of the user's view in the video (viewing position) as his/her view in the direction of the landscape, at which the user is looking, based on the image signal input from the eyeball position detection unit 23. Further, the viewing position acquisition unit 263 acquires direction information which shows the direction that the mobile terminal 2 is facing, i.e. the user's viewing direction. The viewing position acquisition unit 263 generates the viewing position information in which the time a view is detected, the viewing position, the viewing direction, and the terminal position acquired by the position information acquisition unit 261 when the view is detected are associated with each other, and records the viewing position information on the storage unit 25.

Here, the video and the viewing position information are concurrently generated, and it is assumed that there is viewing position information corresponding to each of a plurality of the images included in the video. It should be noted that a video in which a pointer showing the user's view is included may be generated with the collaboration of the captured image acquisition unit 262 and the viewing position acquisition unit 263. Further, the viewing position acquisition unit 263 may detect the trajectory of an eye movement pattern.

Furthermore, according to the present exemplary embodiment, the viewing position information includes the information which shows the terminal position acquired by the position information acquisition unit 261, but it is not limited to this. For example, the viewing position information does not need to include any terminal position, and the control unit 26 may generate information in which the playback position of each of the images included in the video and the terminal position are associated with each other.

[Configuration of Topology Specifying Apparatus 1]

Figure 3:
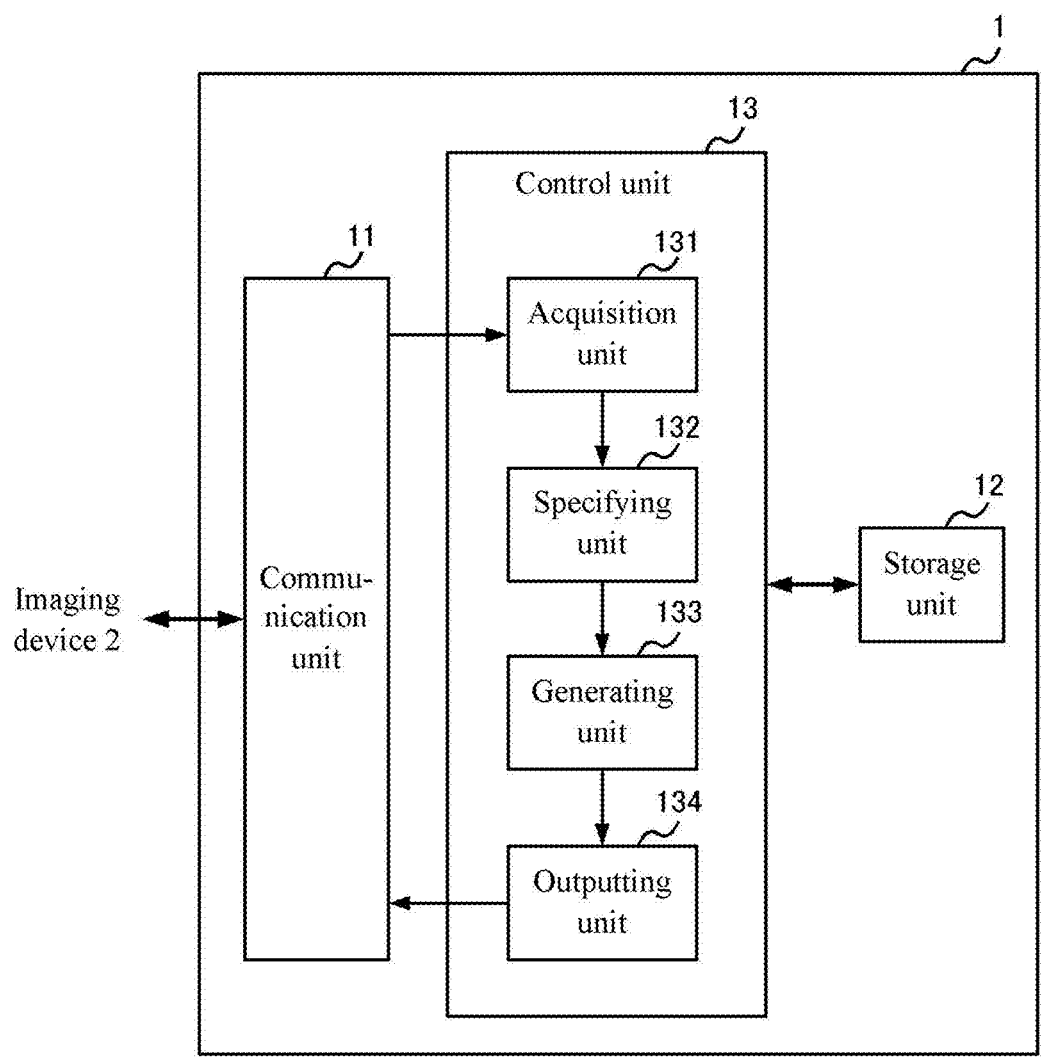
FIG. 3 shows a configuration of a topology specifying apparatus according to the first exemplary embodiment.
Figure 4A:
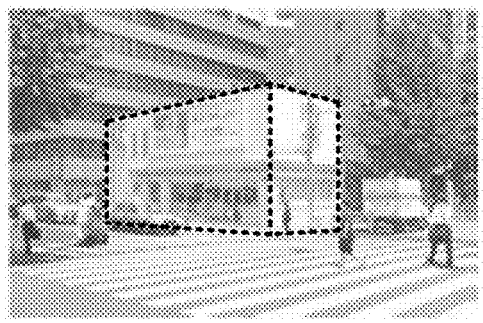
FIGS. 4A to 4D each illustrate a relation between a captured image and a characteristic composition in the captured image.
Figure 4B:
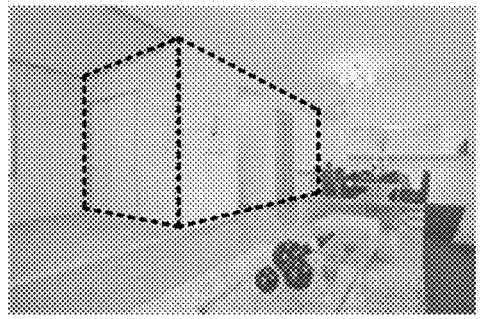
Figure 4C:
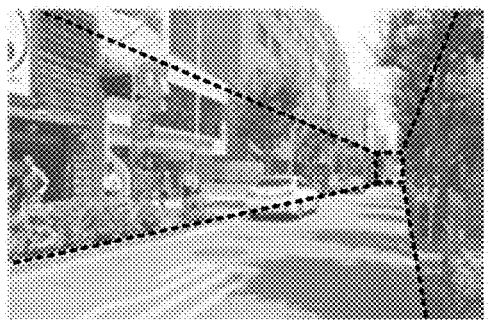
Figure 4D:
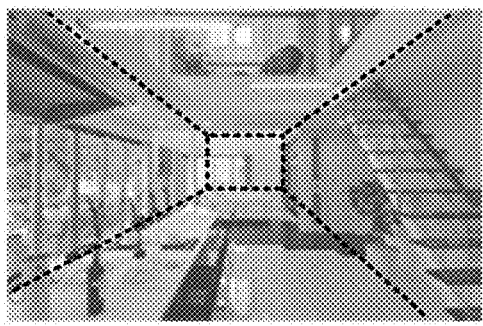

FIG. 3 shows a configuration of the topology specifying apparatus 1 according to the first exemplary embodiment.

The topology specifying apparatus 1 has a communication unit 11, a storage unit 12, and a control unit 13. The control unit 13 has an acquisition unit 131, a specifying unit 132, a generating unit 133, and an outputting unit 134.

The communication unit 11 is a communication interface for receiving the captured image data and the viewing position information from the mobile terminal 2, and for sending the information output from the outputting unit 134 to an external device (for example, a printer or a display). The communication unit 11 is, for example, a wireless communication unit or a USB interface.

The storage unit 12 includes a non-transitory CPU-readable storage medium such as a ROM and a RAM. The storage unit 12 stores, for example, the program executed by the control unit 13. Further, the storage unit 12 stores data necessary for a variety of processes executed by the control unit 13 for specifying the topologies. The storage unit 12, for example, temporarily stores the captured image data and the viewing position information received by the communication unit 11 and outputs the captured image data and the viewing position information to the control unit 13 in response to a request of the control unit 13.

The control unit 13 is, for example, a CPU, and functions as the acquisition unit 131, the specifying unit 132, the generating unit 133, and the outputting unit 134 by executing the program stored in the storage unit 12.

The acquisition unit 131 acquires, through the communication unit 11, object information that shows the shape of the visible object viewed by the user and the viewing position information that shows the user's viewing position in the visual recognition area viewed by the user. The object information is, for example, a captured image of the visual recognition area viewed by the user, which has been captured by an imaging device, three-dimensional data which shows the shape of a building and text data which shows the type of the building's shape and the size of the building. The acquisition unit 131 inputs the acquired object information and viewing position information to the specifying unit 132. The following explanation is for the case where the object information is the captured image.

The specifying unit 132 specifies the topology of the visible object, which is related to the user's impression of the visible object, on the basis of characteristics of the visible object included in the captured image and the viewing position information. The specifying unit 132 specifies, for example, the outline of the visible object in the captured image by extracting high-frequency components in the captured image and then specifies the type of characteristic composition included in the captured image based on characteristics of the specified outline. The characteristic composition is, for example, the composition of one-point perspective, the composition of two-point perspective, or a composition of the mixture of one-point and two-point perspectives.

FIGS. 4A to 4D each illustrate a relation between the captured image and the characteristic composition in the captured image. In the case of the captured images shown in FIGS. 4A and 4B, the specifying unit 132 extracts the outlines shown by the broken lines and specifies the composition of two-point perspective. In the case of the captured images shown in FIGS. 4C and 4D, the specifying unit 132 extracts the outlines shown by the broken lines and specifies the composition of one-point perspective.

Next, the specifying unit 132 specifies the user's eye movement in the time frame including the specified characteristic composition based on the viewing position information and estimates how the composition has been perceived by the user based on the specified eye movement.

Figure 5A:
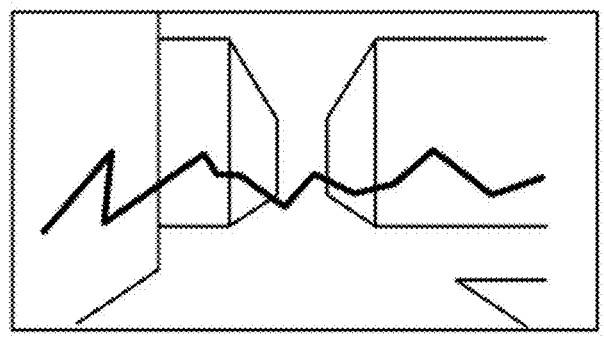
FIGS. 5A to 5C each illustrate a relation between visual movement and the way composition is perceived in response to the visual movement.
Figure 5B:
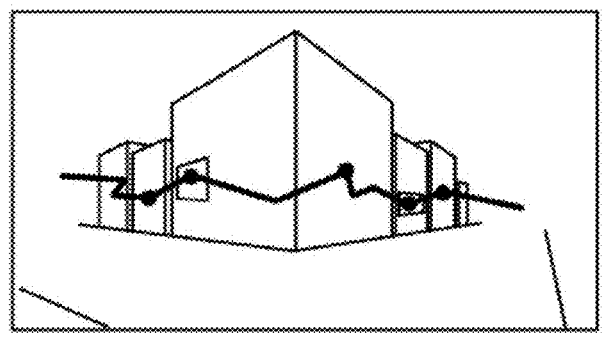
Figure 5C:
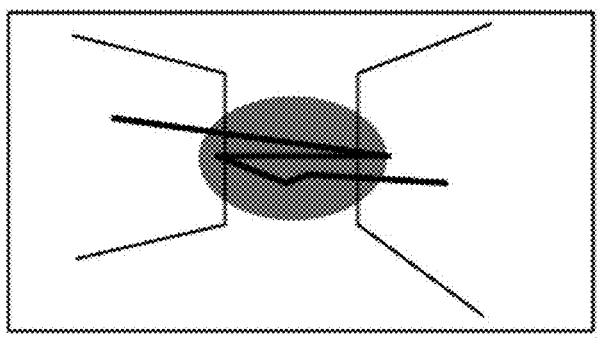

FIGS. 5A to 5C each illustrate a relation between visual movement and the way composition is perceived in response to the visual movement. FIG. 5A shows the case where the user visually recognizes a plurality of visible objects one after another by looking around in the user's visual recognition area. FIG. 5B shows the case where the user visually confirms the visible object by looking at different parts of the specific visible object in the visual recognition area. FIG. 5C shows the case where the user visually recognizes a narrow range of the specific visible object in the visual recognition area by gazing.

"Looking around" is, for example, a state of viewing in which the viewing movement of looking at the same visible object for less than ⅕ of a second and then looking at another visible object for less than ⅕ of a second is repeated. "Looking around" is an act the user takes mainly for orienting him/herself in the space, and, for example, the user is merely looking at the range where arbitrary elements are included but does not grasp what those elements are.

"Confirming" is a state of viewing the same visible object for more than ⅕ of a second and less than one second. "Confirming" is an act the user takes for orienting him/ herself in the space or orienting the visible object, and in this state of viewing, although the user is aware that some arbitrary elements exist in the space, he/she does not grasp what those elements are.

"Gazing" is a state of viewing the same visible object for more than one second. "Gazing" is an act the user takes for confirming the contents of the visible object, and in this state of viewing, the user can decipher the contents such as figures, forms, and letters (for example, shapes of a window, a door, etc., patterns of a finishing material, a form of a building, a form of a plant, a form of furniture, a form of an automobile, a form of a person, information of a sign, a map, a computer screen, etc.)

The specifying unit 132 specifies the topology based on the changing patterns of the viewing position shown in FIGS. 5A to 5C. Specifically, the specifying unit 132 specifies the topology on the basis of the type of the composition specified in the captured image and the changing patterns of the viewing position shown by the viewing position information. For example, the specifying unit 132 specifies a topology which indicates that the user had a strong impression of stability if the composition of one-point perspective is specified in the captured image and the changing pattern of the viewing position is "gazing." The specifying unit 132 specifies a topology which indicates that the user had a strong impression of openness if the composition of two-point perspective is specified in the captured image and the changing pattern of the viewing position is "gazing."

The specifying unit 132 specifies a topology which indicates that the user had a weak impression of stability if the composition of one-point perspective is specified in the captured image and the changing pattern of the viewing position is "confirming." The specifying unit 132 specifies a topology which indicates that the user had a weak impression of openness if the composition of two-point perspective is specified in the captured image and the changing pattern of the viewing position is "gazing."

The specifying unit 132 judges that the user had neither impression of stability nor openness if the changing pattern of the viewing position is "looking around."

FIG. 6 shows a relation between visual movement and the way composition is perceived. The specifying unit 132 estimates from the pattern of eye movement how the user has perceived the composition, on the basis of the relationship shown in FIG. 6, for example.

The element names in FIG. 6 are category names of composition, which are, for example, "paths," "edges," "districts," "nodes," and "landmarks" proposed by Kevin Lynch. "Paths," "edges," "districts," "nodes," and "landmarks" are defined as follows.

"Paths" are routes which the user customarily, occasionally, or potentially takes.

"Edges" are linear elements different from "paths" among linear elements, and they are boundaries between two elements like, for example, shores, railroads tracks, edges of development, and walls.

"Districts" are the medium-to-large size sections of a city and are elements conceived of as having two-dimensional extent. The user mentally enters "inside" of "districts" which are usually perceived from the inside. They are also used for exterior reference if visible from the outside.

"Nodes" are points, the strategic spots in a city. The user can enter a "node," and travel to and from the "node."

"Landmarks" are the objects visually perceived by the user from outside and are usually simply defined objects: buildings, signs, stores, mountains, or the like. The user visually perceives "landmarks" from outside without entering within them.

The specifying unit 132 specifies a composition of one-point perspective or two-point perspective as the composition corresponding to each of a plurality of images included in a video by analyzing each of the images. For example, the specifying unit 132 binarizes the pixel value of each of a plurality of images included in the video based on the brightness, and specifies borderlines of the binary value as lines of perspective. Then, the specifying unit 132 specifies the composition corresponding to the image on the basis of the combination of a plurality of lines of perspective which has been specified in the image.

It should be noted that the specifying unit 132 specified the lines of perspective drawable on an image by binarizing the pixel value, but it is not limited to this. The specifying unit 132 may specify the drawable lines of perspective through analysis of figures or coordinate axes using the perspective structure, a multivalued conversion of pixels based on saturation, an extraction of lines from an image using the algorithm of the Hough transform, a diversification of the pixels based on the change of the pixel value of the images captured before and after the time the image was captured, or a combination of the above methods. Further, the specifying unit 132 may store a plurality of images corresponding to the composition of perspective in the storage unit 12 in advance and specify the composition of perspective by comparing the images included in the video acquired by the acquisition unit 131 with the images stored in the storage unit 12.

Next, the specifying unit 132 detects the element estimated to be perceived by the user on the basis of the specified composition and the pattern of the user's eye movement. Specifically, the specifying unit 132 detects the element estimated to be perceived by the user by referencing element specifying information in which the elements, the patterns of composition, and the patterns of eye movement are associated with each other as shown in FIG. 6. For example, the specifying unit 132 detects "paths" as the element estimated to be perceived by the user when the composition of the image included in the video is the composition of one-point perspective and the pattern of eye movement corresponding to the image is "gazing."

Further, the specifying unit 132 may specify the type of the topology on the basis of the pattern of eye movement or the position of the object visually perceived by the user in the image. For example, it is considered that the user feels closed in when the pattern of eye movement is "looking around" and the angle of the looking around is narrow, and the user tends to have a sense of openness when the angle of the looking around is wide.

The generating unit 133 generates topology-related information in which information associated with the visible object and topology information showing the topology specified by the specifying unit 132 are associated with each other. The generating unit 133 may generate topology-related information corresponding to one user based on the captured image data and the viewing position information acquired from a mobile terminal 2 used by that user, and it may also generate topology-related information using the result of statistical processing of a plurality of topologies which have been specified on the basis of a plurality of pieces of captured image data and viewing position information acquired from mobile terminals 2 used by many users.

The outputting unit 134 outputs the topology-related information generated by the generating unit 133 through the communication unit 11. The outputting unit 134 outputs, for example, the topology-related information to a printer, a display, or an external device.

As the topology-related information, a variety of aspects may be conceived of. Examples of the topology-related information will be explained below.

[Examples of Topology-Related Information]

Figure 7:
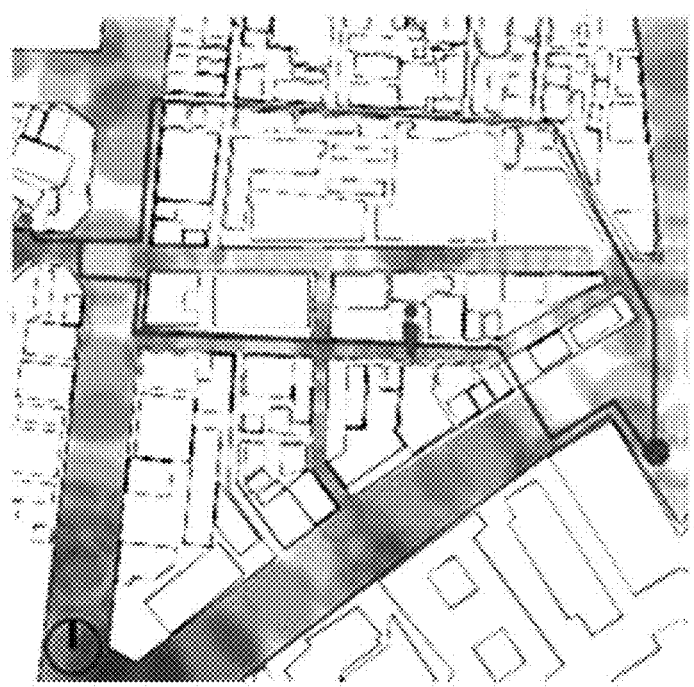
FIG. 7 illustrates an example of topology-related information.

FIG. 7 illustrates an example of topology-related information. The topology-related information shown in FIG. 7 is a topology map which is map information on which the image information showing the topology specified by the specifying unit 132 is superimposed. FIG. 7 reflects the topology specified by the specifying unit 132 based on the captured image data acquired while the user that wears the mobile terminal 2 is walking along the routes on the map. The area shown in dark color is the topology associated with a strong feeling of openness and the area shown in light color is the topology associated with a strong feeling of stability.

The topology map is generated in the following steps.

First, the specifying unit 132 calculates a statistic value by quantifying the topology associated with the strongest feeling of openness as 10 and the topology associated with the weakest feeling of stability as 0 for each of the positions of the mobile terminals 2 where the captured image data has been generated on the basis of the captured image data acquired from the acquisition unit 131. Next, the specifying unit 132 inputs the calculated statistic value, which has been associated with the terminal position information acquired from the mobile terminal 2, into the generating unit 133. Then, the generating unit 133 generates the topology map by superimposing the image of aspects (for example, colors or patterns), corresponding to the topology acquired from the specifying unit 132, on the map information of the area, which corresponds to the terminal position information. In this way, the outputting unit 134 outputs the topology map which is the map information, in which the image showing the topology specified by the specifying unit 132 is superimposed on the map information including the information associated with the visible object.

The topology map shown in FIG. 7 is useful for grasping the tendency of the topology perceived by the user in a city or the like. For example, an architect can utilize the topology map for designing the city or the like by evaluating the city or the like using the topology map.

It should be noted that the generating unit 133 may generate the topology map based on the statistic value of a plurality of topologies which has been specified on the basis of the captured image data and the viewing position information acquired from the mobile terminals 2 worn by many users. An architect, an urban planner, an interior designer, and the like can grasp the topologies by using the above mentioned topology map, and they can utilize this for designing the city or the like.

Further, in the above explanation, it was assumed that the user walks in the city or the like wearing the mobile terminal 2, but a virtual reality video, generated by computer graphics, may also be used by providing a video playback function with the mobile terminal 2. For example, an architect can create the virtual reality video or building information modeling (BIM) data of the city or the like, which he/she is designing, and the architect can specify the topologies associated with the user's impression from the city or the like by detecting the viewing position of the user while he/she is watching the virtual reality video on the mobile terminal 2. Accordingly, the architect can design better cities and the like through design changes on the basis of the topologies specified in this way.

Variation 1

In the above explanation, an example of the acquisition unit 131 acquiring the captured image data, which has been output from the mobile terminal 2, is explained, but the acquisition unit 131 may acquire the captured image data from other devices. For example, the acquisition unit 131 may acquire the captured image data from the server which provides the captured image data associated with the position information. In this case, the specifying unit 132 selects the captured image data corresponding to the terminal position, where the viewing position information has been generated, on the basis of the terminal position included in the viewing position information, and then the specifying unit 132 can specify the topology using the selected image data.

Variation 2

The case where the generating unit 133 generates the topology map using the coordinates, showing the viewing position, as the viewing position information has been explained above, but the generating unit 133 may generate the topology map using the viewing movement information, which shows the aspect of eye movement, as the viewing position information. Specifically, the generating unit 133 generates, in advance, the topology estimate map in which a street surrounded by buildings is considered to be the topology of one-point perspective which is associated with a strong feeling of stability. Then the generating unit 133 changes the topology of the position, where viewing movement information is acquired, to the topology of a strong feeling of openness, when it judges that the user's viewing movement corresponds to the feeling of openness of two-point perspective, on the basis of the viewing movement information acquired while the user is walking in a city or the like wearing the mobile terminal 2. The generating unit 133 judges a topology to be associated with strong feeling of openness, for example, when the viewing movement information shows wide eye movement. In this manner, the topology specifying apparatus 1 can generate the topology map even when a mobile terminal 2 that cannot output the coordinate information showing the viewing position is used.

Effect of the First Exemplary Embodiment

As described above, in the topology specifying apparatus 1 according to the first exemplary embodiment, the specifying unit 132 specifies the topology of the visible object, which is associated with the user's impression of the visible object, on the basis of the characteristics of the visible object included in the captured image, and the viewing position information. Then, the outputting unit 134 outputs the information included in the map of a city or the like associated with the visible object and the topology information showing the topology specified by the specifying unit 132 are associated with each other. In this manner, the architect, the urban planner, the interior designer, and the like can precisely grasp what impression the user derives from a particular place in a city or the like, and they can make use of the user's impression for designing a city or the like. As a result, the user can actively participate in the designing of the buildings and cities.

The Second Exemplary Embodiment

In the first exemplary embodiment, the topology specifying apparatus 1 generates the topology-related information on the basis of the terminal position information, the captured image data and the viewing position information generated in the mobile terminal 2. On the other hand, the second exemplary embodiment differs from the first exemplary embodiment in that the mobile terminal 3 generates the terminal position information, the captured image data, and the viewing position information, and specifies the topology. The mobile terminal 3 is also somewhat like the topology specifying apparatus in that it includes a portion of the functions included in the topology specifying apparatus 1 in the first exemplary embodiment.

Figure 8:
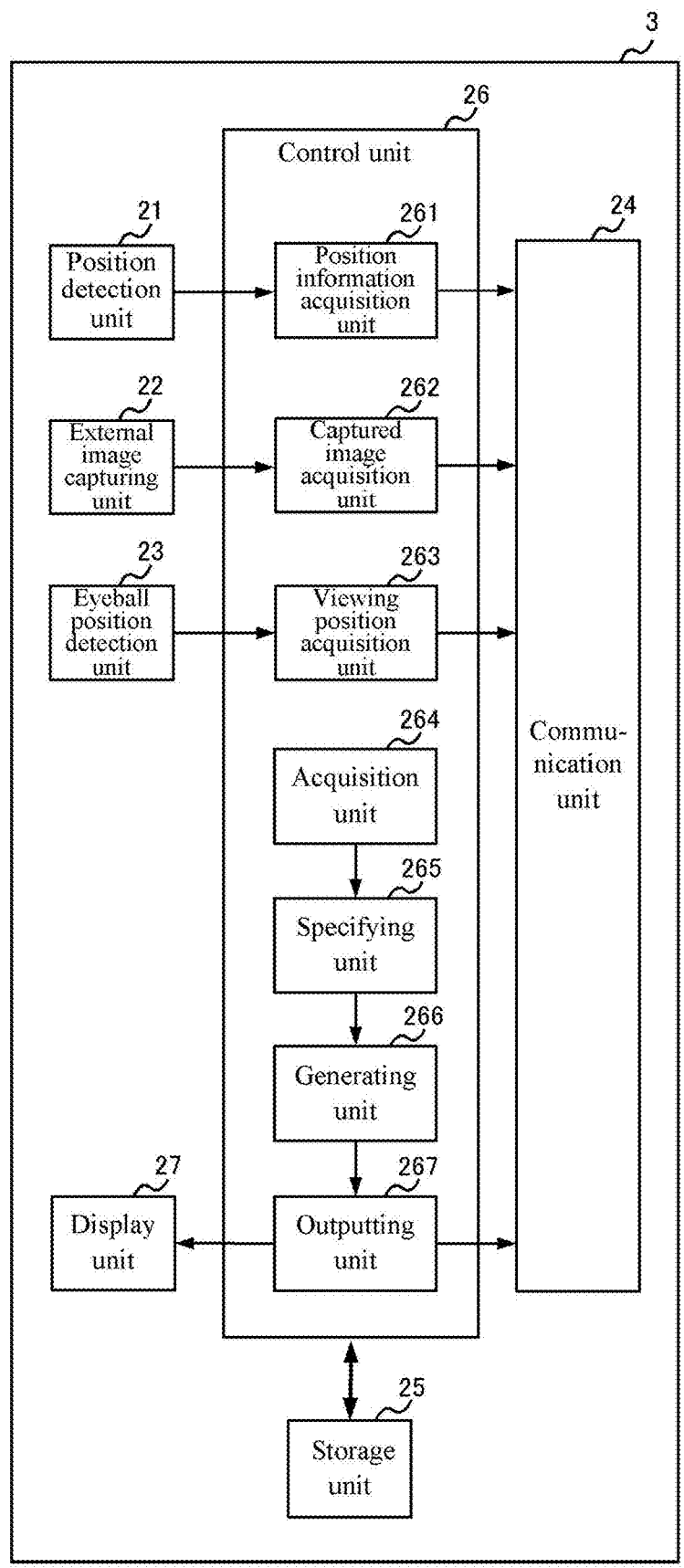
FIG. 8 shows a configuration of a mobile terminal according to the second exemplary embodiment.

FIG. 8 shows a configuration of a mobile terminal 3 according to the second exemplary embodiment. The mobile terminal 3 differs from the mobile terminal 2 in that it includes the acquisition unit 264, the specifying unit 265, the generating unit 266, the outputting unit 267 and the display unit 27 in addition to the function units included in the mobile terminal 2 shown in FIG. 3.

The acquisition unit 264 has a function equivalent to that of the acquisition unit 131 in the topology specifying apparatus 1 shown in FIG. 2. The acquisition unit 264 acquires the terminal position information from the position information acquisition unit 261, acquires the captured image data corresponding to the position and the direction of the mobile terminal 3 from the captured image acquisition unit 262 or the external apparatus (not shown in figure), and acquires the viewing position information from the viewing position acquisition unit 263. The captured image in the present exemplary embodiment is a kind of map image including at least one of the routes and the buildings.

Further, the acquisition unit 264 acquires, from the external apparatus, guide information which is associated with the captured image data and corresponds to the position and the direction of the mobile terminal 3. The guide information is information (for example, augmented reality information) for guiding the user carrying the mobile terminal 3 along the route included in the captured image. The guide information is, for example, information indicating the name or position of a route, a building, or the like. The acquisition unit 264 acquires a plurality of pieces of guide information associated with, for example, the type of the topology and the position information.

Further, the acquisition unit 264 acquires topology tendency information which shows a user's tendency of grasping the topology of the visible object included in the captured image (hereinafter, topology grasp tendency). The way the acquisition unit 264 acquires the topology tendency information is arbitrary, and the acquisition unit 264 may acquire, for example, the topology tendency information specified by the specifying unit 265 or the topology tendency information specified by using the topology specifying apparatus 1 explained in the first exemplary embodiment. The acquisition unit 264 provides notification of the acquired topology tendency information to the generating unit 266.

The specifying unit 265 specifies the composition perceived by the user in the captured image data and the topology of the visible object on the basis of the captured image data and the viewing position information. The specifying unit 265 displays a plurality of pieces of captured image data for measuring the tendency on the display unit 27 in order to specify the user's topology grasp tendency, and it can specify the user's topology grasp tendency on the basis of the viewing position and movement while the captured image data is on display.

The generating unit 266 generates the image information in which the guide information selected based on the topology perceived by the user or the topology indicated by the topology tendency information, which has been acquired in advance, is superimposed on the captured image. Specifically, the generating unit 266 selects the guide information associated with the position of the mobile terminal 3, the topology concurrently specified by the specifying unit 265 or the type of the topology corresponding to the topology grasp tendency, which has been specified by the specifying unit 265 in advance, from among a plurality of pieces of guide information associated with the type of the topology and the position information, that have been acquired by the acquisition unit 264, and the generating unit 266 superimposes the selected guide information on the captured image.

The outputting unit 267 displays the image information, on which the guide information has been superimposed by the generating unit 266, on the display unit 27. The display unit 27 is, for example, a liquid crystal display, that can display image information.

Figure 9A:
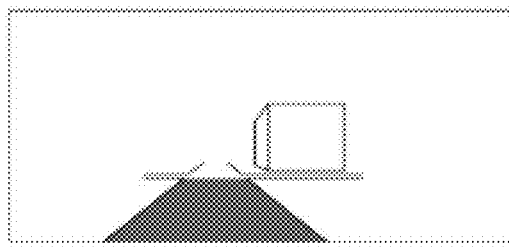
FIGS. 9A to 9D each show an example of image information created by a generating unit.
Figure 9A:

FIGS. 9A to 9D each show an example of image information generated by the generating unit 266. FIG. 9A shows the image information displayed when the specifying unit 265 specifies the topology associated with a strong sense of stability as the user's impression of the visible object included in the captured image. In a case where the user strongly perceives the composition of one-point perspective and feels stability, it is conceivable that the guide information becomes more accessible for the user if the guide information is displayed on the route along which the user is walking in the composition of one-point perspective. So, in FIG. 9A, the guide information indicating the name of the street is superimposed on the image area of the route along which the user is walking.

Figure 9B:
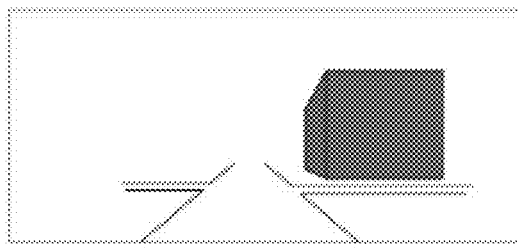
Figure 9B:
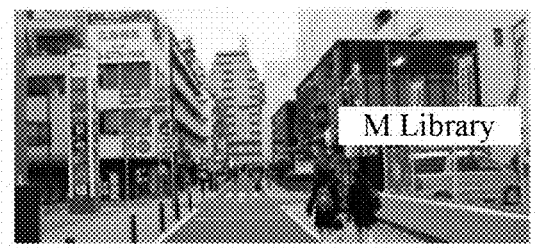

FIG. 9B shows the image information which is displayed when the specifying unit 265 specifies that the user perceives the topology associated with a strong sense of openness from the visible object included in the captured image. In a case where the user strongly perceives the composition of two-point perspective and feels openness, the guide information becomes more accessible for the user when it is displayed on the peripheral area of the route along which the user is walking in the composition of two-point perspective. In FIG. 9B, the guide information indicating the name of the building is superimposed on the peripheral image area of the route along which the user is walking.

Figure 9C:
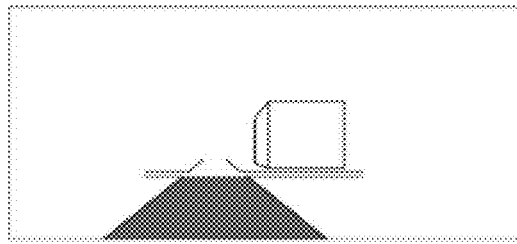
Figure 9C:

In FIG. 9C, the generating unit 266 does not decide whether or not to display the image depending on whether the user feels stability or openness, but the generating unit 266 changes the aspect of displaying the information in accordance with the intensity of the user's sense of stability or openness. For example, when the user feels strong stability, the generating unit 266 may display the guide information showing the name of the building in FIG. 9B in a lighter color (i.e., with increased transmissivity) than the color of the street name displayed in FIG. 9A. By controlling the superimposition amount of the guide information in accordance with the user's subjective perspective based on the topology perceived by the user, the user can conduct an easy-to-understand search.

Figure 9D:
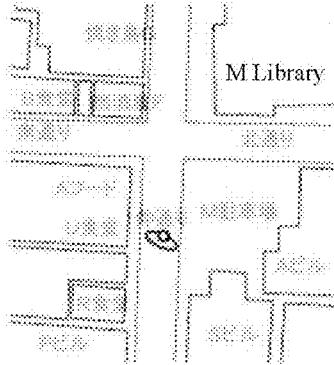

In FIG. 9D, the generating unit 266 changes the aspect of displaying the guide information of a map and the like depending on whether the user feels stability or openness. For example, as shown in FIG. 9D, the generating unit 266 may display the names of the buildings and the like that are not visible objects to the user, in a light color (i.e., with increased transmissivity) in a case where the user strongly feels openness on the street because of the two-point perspective. By controlling information of the bird's-eye view based on the topology perceived by the user to be clearly read, the user can conduct an easy-to-understand search.

Figure 10A:
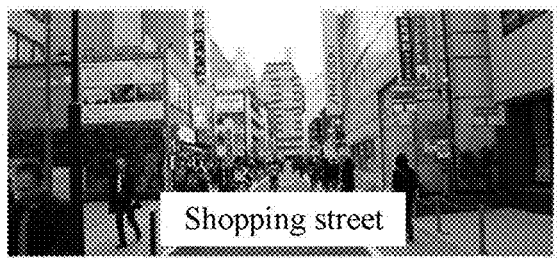
FIGS. 10A to 10C each show other example of image information created by a generating unit.
Figure 10B:
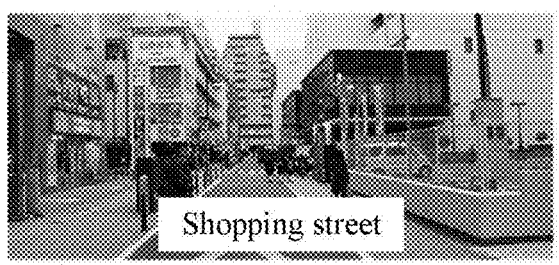
Figure 10C:
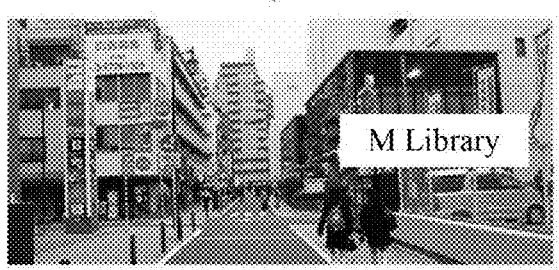

FIGS. 10A to 10C each show other example of image information created by the generating unit 266. The generating unit 266 may change the aspect of displaying the guide information simultaneously with the change of the composition included in the captured image. FIGS. 10A and 10B show the composition associated with the user's feeling of stability, and the guide information indicating the street name is superimposed on the image area of the route along which the user is walking. The generating unit 266 superimposes the guide information indicating the names of the buildings around the route, along which the user is walking, in a case where the acquisition unit 131 acquires the captured image of FIG. 10C after acquiring the captured image of FIG. 10B, and the specifying unit 265 specifies that the user has a feeling of openness. In this way, the user can acquire appropriate guide information for each timing because the generating unit 266 can change the aspect of displaying the guide information, in a timely manner, in accordance with the type of the topology perceived by the user.

Figure 11A:
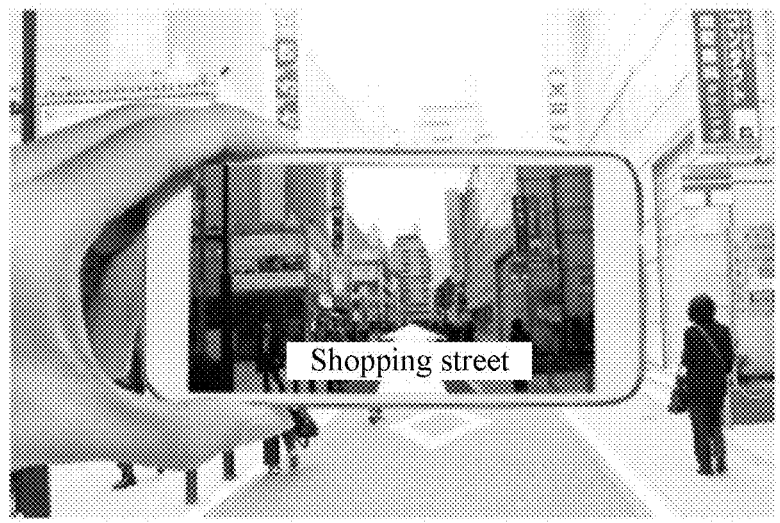
FIGS. 11A and 11B each show other example of age information created by a generating unit.
Figure 11B:
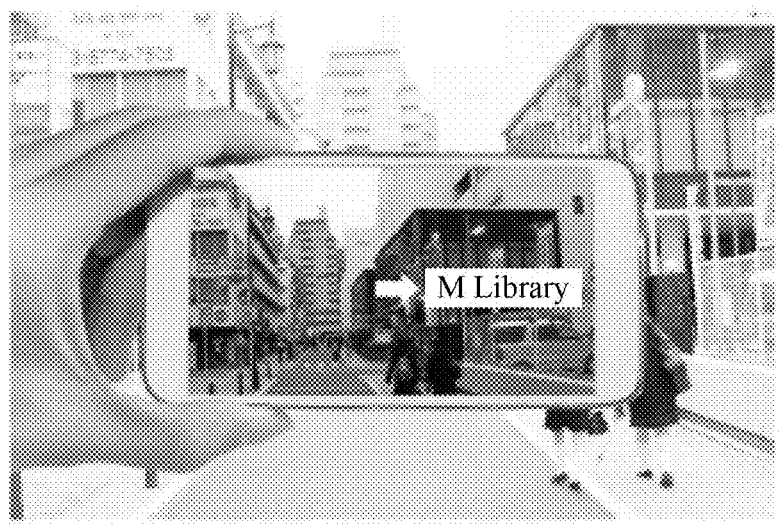

FIGS. 11A and 11B each show other example of image information generated by the generating unit 266. FIGS. 11A and 11B each show the image displayed by the navigation application software, which displays the captured image on which the guide information is superimposed while the user is walking in the area with a plurality of buildings.

FIG. 11A shows the state where the guide information, which is selected when the user of the mobile terminal 3 strongly perceives the composition of one-point perspective and he/she has the topology grasp tendency toward the sense of stability, is superimposed. For this kind of user, it is effective to display the guide information such as the name of the street where the user is, the arrow showing the user's destination including the street itself, and the like on the street where the user is and the topology whose type is identical to the type of the topology perceived by the user exists.

FIG. 11B shows the state where the guide information, which is selected when the user of the mobile terminal 3 strongly perceives the composition of two-point perspective and he/she has the topology grasp tendency toward the sense of stability, is superimposed. For this kind of user, it is effective to display the guide information of the name of the building, the guide information of the arrow, and the like showing the direction of the destination, at the position of the building that is the position where the topology whose type of the topology is identical to the type of the topology perceived by the user exists.

Variation 1

The case where the generating unit 266 generates the image information by superimposing the guide information on the captured image captured while the user carrying the mobile terminal 3 is walking has been explained above. However, the generating unit 266 may also generate the image information by superimposing the guide information that is suitable for the topology or the topology grasp tendency, specified by the specifying unit 265, on the captured image, corresponding to the position of the mobile terminal 3, which has been acquired by the acquiring unit 264 from the external apparatus.

Variation 2

The generating unit 266 may superimpose the information of the type of the topology being perceived by the user, which has been specified by the specifying unit 265, on the captured image as the guide information. For example, the generating unit 266 superimposes the icon image showing one-point perspective or the icon image showing two-point perspective on the lower right area of the screen. In this way, the user can recognize his/her own topology grasp tendency. The mobile terminal 3 lets the user set up his/her own topology grasp tendency, recognized by the user in this way, and the mobile terminal 3 may also store the topology grasp tendency, which has been set by the user, in the storage unit 25. The generating unit 266 can generate the image information without using the topology specified simultaneously by the specifying unit 265, by selecting the guide information suitable for the user using the topology grasp tendency stored in the storage unit 25.

Variation 3

In the above explanation, the specifying unit 265 used the captured image acquired by the captured image acquisition unit 262 as the map image, but the map image is not limited to the captured image. The map image may be an image generated by a computer or a person, and not a captured image generated by shooting an object.

Effect of the Second Exemplary Embodiment

Many conventional technologies to display the route guidance information on the mobile terminal have been known (for example, Japanese Unexamined Patent Application Publication No. 2016-008894). However, differences of user's topology grasp tendencies have not been considered in the conventional technologies, so some users felt the guide information to be inaccessible. On the other hand, in the second exemplary embodiment, the map image (including the captured image) of a city or the like, on which the guide information selected on the basis of the user's tendency to grasp the topology of the visible object is superimposed, can be displayed on the mobile terminal 2. In this way, the guide information suitable for the user's topology grasp tendency can be provided for the users, which makes it possible to guide the users without making them lose the way.

The Third Exemplary Embodiment

In the first exemplary embodiment and the second exemplary embodiment, the topology specifying apparatus superimposes the information corresponding to the topology perceived by the user on the image information, and outputs this information, but the third exemplary embodiment differs from the first and second exemplary embodiments in that the topology specifying apparatus outputs the information for controlling an electronic device based on the topology perceived by the user.

Figure 12A:
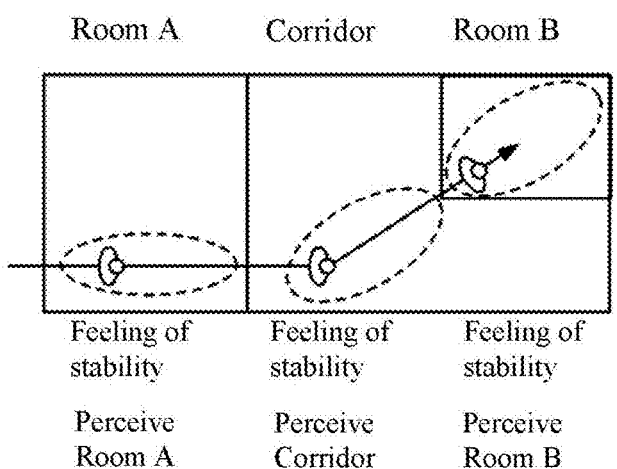
FIGS. 12A and 12B each illustrate an outline of the third exemplary embodiment.
Figure 12B:
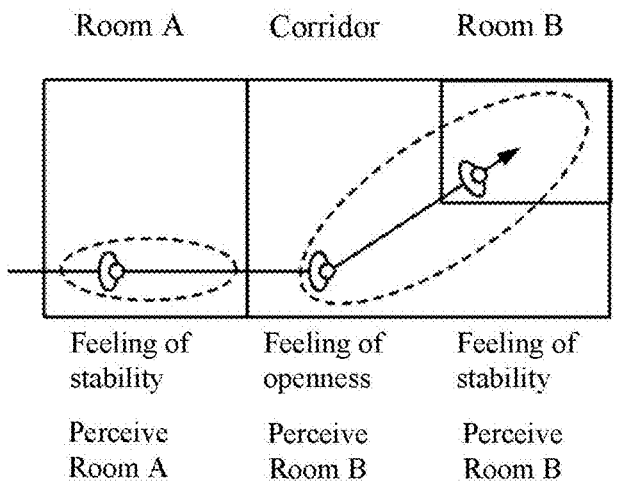

FIGS. 12A and 12B each illustrate an outline of the third exemplary embodiment. As shown in FIGS. 12A and 12B, the user may feel the stability or openness depending on his/her position while he/she is walking. In FIG. 12A, the user also feels the stability in a corridor in addition to the rooms A and B which are a closed space. At this moment, the user is supposed to be walking, perceiving the corridor itself. In this case, it is appropriate to turn on the lighting device in the corridor while the user is walking down the corridor.

On the other hand, in FIG. 12B, the user feels openness while he/she is walking down the corridor, and he/she perceives the room B at the end of the corridor. In this case, it is appropriate to turn on the lighting device in the room B while the user is walking down the corridor.

So, the generating unit 266 generates the control information for controlling the electronic device(s) selected from the plurality of the electronic devices, which are provided in the object included in the captured image, on the basis of the topology specified by the specifying unit 265. Then the outputting unit 267 sends the control information, generated by the generating unit 266, via the communication unit 24 to the selected electronic device or the control apparatus, which controls the electronic device. The electronic devices are, for example, lighting devices, air conditioning devices, ventilating devices, sound devices, blinds, televisions, or personal computers, and the control apparatus is the apparatus for switching the electronic devices on/off or changing the settings of the electronic devices.

Figure 13A:
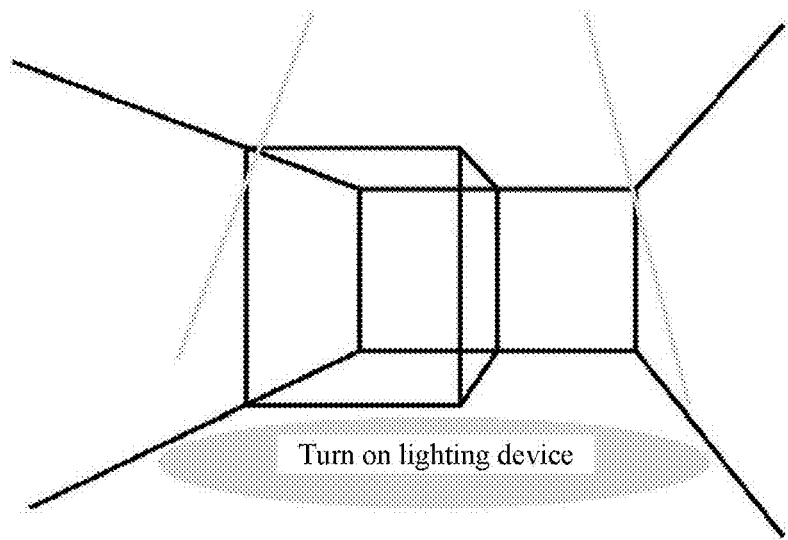
FIGS. 13A and 13B each show an example of turning a lighting device on along the user's walking route based on the topology specified by a specifying unit.
Figure 13B:
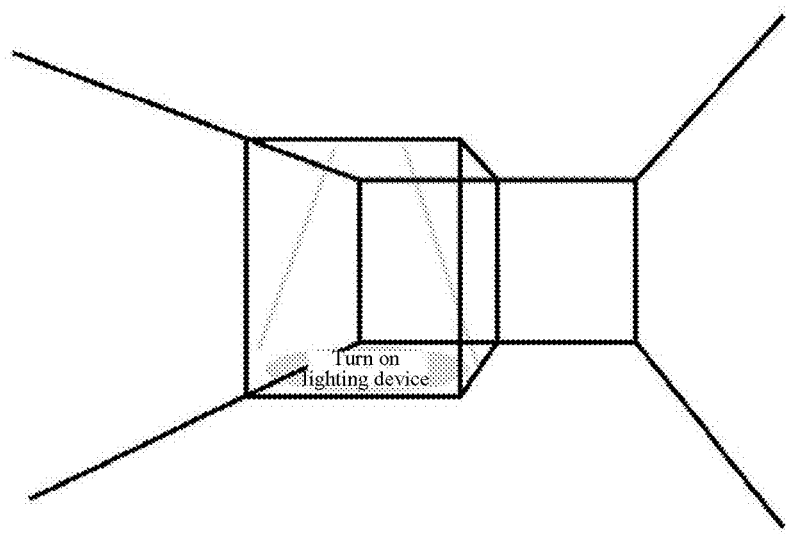

FIGS. 13A and 13B each show an example of turning on the lighting device along the user's walking route based on the topology specified by the specifying unit 265. FIG. 13A, which corresponds to FIG. 12A, shows the state where the lighting device in the corridor is turned on when the user feels the stability while he/she is walking down the corridor. The outputting unit 267 sends the control information for turning on the lighting device in the corridor when the specifying unit 265 specifies the topology associated with the stability while the user is walking down the corridor. The outputting unit 267 can turn on the lighting device near the mobile terminal 3 in the corridor, for example, by sending the control information on the radio wave, the reach of which is within the first range, namely the proximity of the mobile terminal 3. The outputting unit 267 may also turn on the lighting device in the corridor by acquiring the identification information of the lighting device in the corridor in advance, and sending the control information including the identification information of the lighting device in the corridor.

FIG. 13B, which corresponds to FIG. 12B, shows the state where the room B at the end of the corridor is lit, while the user is walking down the corridor and he/she feels openness. The outputting unit 267 sends the control information for turning on the lighting device in the room B to the control apparatus, when the specifying unit 265 specifies the topology associated with the openness while the user is walking down the corridor. The outputting unit 267 can turn on the lighting device in the room B, for example, by sending the control information on a radio wave, the reach of which is within the second range, which is broader than the first range. The outputting unit 267 may also turn on the lighting device in the room B by acquiring the identification information of the lighting device in the room B in advance, and sending the control information including the identification information of the lighting device in the room B.

Effect of the Third Exemplary Embodiment

As described above, the mobile terminal 3 according to the third exemplary embodiment can control the electronic device provided in the places to where the user is walking, depending on the topology obtained while the user is walking. In this way, the electronic device can be controlled in accordance with the user's feelings without having the user operate the device, whereas conventionally, the user had to operate the electronic device.

The present invention is described with the exemplary embodiments of the present invention but the technical scope of the present invention is not limited to the scope described in the above embodiment.

It is apparent for those skilled in the art that it is possible to make various changes and modifications to the embodiment. It is also apparent from the description of the appended claims that the above embodiment with the various changes and modifications can also be within the technical scope of the present invention.

For example, the case where the viewing position acquisition unit 263 specifies the viewing position on the basis of the image signal generated by the eyeball position detection unit 23 according to the intensity of the reflected light on the pupil and the cornea was explained above, but the way the viewing position is specified is not limited to this. For example, the eyeball position detection unit 23 may output the signal of the detected electric potential of the skin which changes depending on the eyeball movement, and the viewing position acquisition unit 263 may specify the viewing position on the basis of the above signal.

Further, the following invention is also disclosed by the above exemplary embodiments.

(1) A mobile terminal carried by a user, including an acquisition unit that acquires a map image, including at least one of a route and a building, and topology tendency information showing the user's tendency to grasp a topology of a visible object, included in the map image, and a display unit that displays the map image on which the relevant guide information selected on the basis of the above topology is superimposed.

(2) The mobile terminal according to (1), wherein the acquisition unit acquires the map image corresponding to a position of the mobile terminal, and the guide information associated with this map image.

(3) The mobile terminal according to (2) further includes a detection unit that detects the direction of the mobile terminal, wherein the acquisition unit of the mobile terminal acquires the map image corresponding to the direction detected by the detection unit and the terminal position information, and the guide information associated with this map image.

(4) The mobile terminal according to (2) or (3), wherein the acquisition unit acquires a plurality of pieces of the guide information associated with a type of the topology and the position information, and the outputting unit acquires the guide information corresponding to the terminal position information acquired by the position acquisition unit and also corresponding to the topology indicated by the topology tendency information from the plurality of pieces of the guide information.

(5) The mobile terminal according to (1) further includes an image capturing unit that generates the map image by capturing an image area around the mobile terminal, wherein the acquisition unit acquires the map image generated by the capturing unit, and the display unit displays the guide information showing which route to take inside the map image.

(6) The mobile terminal according to (5) further includes the specifying unit that specifies the topology of the visible object included in the map image, wherein the display unit displays the guide information corresponding to the topology specified by the specifying unit.

(7) The mobile terminal according to (6) further includes a position acquisition unit that acquires the terminal position information showing the position of the mobile terminal, wherein the acquisition unit acquires the map image corresponding to the terminal position information, and the guide information associated with the map image.

(8) The mobile terminal according to (7) further includes a detection unit that detects the direction of the mobile terminal, wherein the acquisition unit acquires the map image, corresponding to the direction detected by the detection unit and the terminal position information, and the guide information associated with this map image.

(9) The mobile terminal according to any one of (6) to (8) further includes a viewing position acquisition unit that acquires the viewing position information showing the user's viewing position in the image area, wherein the acquisition unit acquires the topology tendency information on the basis of the viewing position information, acquired by the viewing position acquisition unit, and the topology specified by the specifying unit.

(10) A mobile terminal carried by a user including an acquisition unit which acquires a map image and topology tendency information showing the user's tendency to grasp a topology of a visible object included in the map image, and a communication unit that sends control information for controlling electronic devices provided in an object included in the map image.

(11) A non-transitory computer-readable storage medium storing a program for making a computer, included in a mobile terminal carried by a user, perform the steps of acquiring a map image, acquiring a topology tendency information showing a topology of a visible object, which has been specified based on the relations between characteristics of the user's visible object included in the map image and viewing position information, superimposing guide information of the map image, which has been selected on the basis of the topology, on the map image and displaying this map image.

(12) A mobile terminal including an image capturing unit that captures an image of imaging area including a visible object visually perceived by a user, an acquisition unit that acquires viewing position information showing the user's viewing position or movement in an imaging area, a specifying unit that specifies a topology of the visible object associated with the user's impression of the visible object based on the relations between characteristics of the visible object included in the captured image and the viewing position information, and an outputting unit that makes the display unit display the topology information showing the topology specified by the specifying unit while the user is viewing the visible object.

The present invention is described with the exemplary embodiments of the present invention but the technical scope of the present invention is not limited to the scope described in the above embodiment. It is apparent for those skilled in the art that it is possible to make various changes and modifications to the embodiment. It is also apparent from the description of the appended claims that the above embodiment with the various changes and modifications can also be within the technical scope of the present invention.

What is claimed is:

1. A topology specifying method, comprising:
    acquiring a captured image including a plurality of visible objects that shows each shape of the visible objects viewed by a user and viewing position information that shows a position or movement of the user's view in a visual recognition area viewed by the user;
    specifying a topology of the visible objects that is associated with the user's impression of the visible objects on the basis of each shape of the visible objects included in the object information and the viewing position information; and
    outputting, to a display visible by the user, (i) information indicating that the user perceives composition of one-point perspective in the captured image by superimposing that information on a street where the user is, in the captured image, when the specified topology indicates that the user perceives composition of one-point perspective in the captured image, and (ii) information indicating that the user perceives composition of two-point perspective in the captured image by superimposing that information on a position of a building which is different from a position of the street where the user is, in the captured image, when the specified topology indicates that the user perceives composition of two-point perspective in the captured image.

2. The topology specifying method according to claim 1, wherein the specifying specifies the topology on the basis of (i) a type of composition specified based on the object information, and (ii) a pattern of changing a viewing position shown by the viewing position information.

3. The topology specifying method according to claim 2, wherein the specifying specifies (i) the topology showing that the user has an impression of stability when composition of one-point perspective is specified based on the object information and (ii) the topology showing that the user has an impression of openness when composition of two-point perspective is specified based on the object information.

4. The topology specifying method according to claim 2, wherein the specifying specifies the topology by detecting at least one of "paths," "edges," "districts," "nodes," and "landmarks" as an element estimated to be perceived by the user on the basis of a specified composition and a pattern of the user's eye movement.

5. The topology specifying method according to claim 1, wherein the specifying specifies the topology based on a position of an object visually perceived by the user.

6. The topology specifying method according to claim 1, wherein the specifying specifies the topology based on an angle of the user's looking around.

7. The topology specifying method according to claim 1, wherein the outputting outputs map information in which an image, showing the topology specified by the specifying, is superimposed on a map including information associated with the visible objects.

8. The topology specifying method according to claim 1, wherein
the acquiring acquires, as the object information, a captured image that includes the visible objects, and
the outputting outputs a guide image in which a route guidance image with an aspect corresponding to the topology is superimposed on the captured image.

9. The topology specifying method according to claim 8, wherein the outputting displays information of the topology on a screen, displaying the captured image including the visible objects.

10. The topology specifying method according to claim 1, wherein
the acquiring acquires the captured image including the plurality of the visible objects, as object information, and
the outputting outputs a guide image in which guide information is superimposed on the visible objects corresponding to the topology perceived by the user in the captured image.

11. The topology specifying method according to claim 1, wherein
the acquiring acquires the captured image including the plurality of the visible objects, as object information, and
the outputting outputs a guide image on which is superimposed guide information with an aspect that is determined on the basis of a type of the topology perceived by the user in the captured image.

12. The topology specifying method according to claim 11, wherein
the outputting superimposes the guide information on the street where the user is, in the captured image, when the user perceives composition of one-point perspective in the captured image.

13. The topology specifying method according to claim 11, wherein
the outputting superimposes the guide information on a position of a building where the user is not, in the captured image, when the user perceives composition of two-point perspective in the captured image.

14. The topology specifying method according to claim 1, wherein
the outputting includes displaying, on the display visible to the user, (i) guide information indicating a name of the street by superimposing that guide information on the street where the user is, in the captured image, when the specified topology indicates that the user perceives composition of one-point perspective in the captured image, and (ii) guide information indicating a name of the building by superimposing that guide information on a position of the building which is different from a position of the street where the user is, in the captured image, when the specified topology indicates that the user perceives composition of two-point perspective in the captured image.

15. A topology specifying apparatus, comprising:
a processor configured to,
acquire a captured image including a plurality of visible objects showing each shape of the visible objects viewed by a user and viewing position information showing a position or movement of the user's view in a visual recognition area viewed by the user;
specify a topology of the visible objects, which is associated with the user's impression of the visible objects, on the basis of each shape of the visible objects included in the object information and the viewing position information; and
output, to a display visible by the user, (i) information indicating that the user perceives composition of one-point perspective in the captured image by superimposing that information on a street where the user is, in the captured image, when the specified topology indicates that the user perceives composition of one-point perspective in the captured image, and (ii) information indicating that the user perceives composition of two-point perspective in the captured image by superimposing that information on a position of a building which is different from a position of the street where the user is, in the captured image, when the specified topology indicates that the user perceives composition of two-point perspective in the captured image.

16. A non-transitory computer-readable storage medium storing a program for causing a computer to perform:
acquiring a captured image including a plurality of visible objects that shows each shape of the visible objects viewed by a user and viewing position information that shows a position or movement of the user's view in a visual recognition area viewed by the user;
specifying a topology of the visible objects which is associated with the user's impression of the visible objects on the basis of each shape of the visible objects included in the object information and the viewing position information; and
outputting, to a display visible by the user, (i) information indicating that the user perceives composition of one-point perspective in the captured image by superimposing that information on a street where the user is, in the captured image, when the specified topology indicates that the user perceives composition of one-point perspective in the captured image, and (ii) information indicating that the user perceives composition of two-point perspective in the captured image by superimposing that information on a position of a building which is different from a position of the street where the user is, in the captured image, when the specified topology indicates that the user has perceived composition of two-point perspective in the captured image.

17. A topology specifying method, comprising:
acquiring a captured image including a plurality of visible objects that shows each shape of the visible objects viewed by a user and viewing position information that shows a position or movement of the user's view in a visual recognition area viewed by the user;

specifying a topology of the visible objects that is associated with the user's impression of the visible objects on the basis of each shape of the visible objects included in the object information and the viewing position information; and turning on a lighting device provided in an aisle where the user is, in the captured image, when the specified topology indicates that the user perceives composition of one-point perspective in the captured image, and turning on a lighting device provided in a room at the end of aisle where the user is, in the captured image, when the specified topology indicates that the user has perceived composition of two-point perspective in the captured image.

* * * * *